US012693760B2

(12) United States Patent
Oh et al.

(10) Patent No.: US 12,693,760 B2
(45) Date of Patent: Jul. 28, 2026

(54) DISPLAY DEVICE AND MOBILE ELECTRONIC DEVICE INCLUDING SAME

(71) Applicant: SAMSUNG DISPLAY CO., LTD., Yongin-si (KR)

(72) Inventors: Ye Rin Oh, Yongin-si (KR); Bong Il Kang, Yongin-si (KR); Min Hong Kim, Yongin-si (KR); Jung Mok Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 29 days.

(21) Appl. No.: 18/813,232

(22) Filed: Aug. 23, 2024

(65) Prior Publication Data

US 2025/0147620 A1     May 8, 2025

(30) Foreign Application Priority Data

Nov. 6, 2023     (KR) ......................... 10-2023-0151794

(51) Int. Cl.
G06F 3/041          (2006.01)
G06F 3/044          (2006.01)

(52) U.S. Cl.
CPC ........ G06F 3/04166 (2019.05); G06F 3/0443 (2019.05)

(58) Field of Classification Search
None
See application file for complete search history.

(56) References Cited

U.S. PATENT DOCUMENTS

| | | | | |
|---|---|---|---|---|
| 9,958,975 | B2 * | 5/2018 | Kim | G06F 3/0412 |
| 10,955,951 | B2 * | 3/2021 | Lee | G02F 1/13338 |
| 11,675,459 | B1 * | 6/2023 | Kang | G06F 3/04184 |
| | | | | 345/174 |
| 11,880,533 | B1 * | 1/2024 | Chen | H02M 3/158 |
| 2013/0076648 | A1 * | 3/2013 | Krah | G06F 3/04164 |
| | | | | 345/173 |
| 2025/0244846 | A1 * | 7/2025 | Kang | G06F 3/0412 |

FOREIGN PATENT DOCUMENTS

| | | | | | |
|---|---|---|---|---|---|
| CN | 106773176 | B | * | 2/2020 | G02F 1/1323 |
| CN | 120045091 | A | * | 5/2025 | G06F 3/04186 |
| KR | 10-2601361 | B1 | | 11/2023 | |
| WO | WO-2013043337 | A1 | * | 3/2013 | G06F 3/0412 |

* cited by examiner

*Primary Examiner* — Duane N Taylor, Jr.
(74) *Attorney, Agent, or Firm* — F. CHAU & ASSOCIATES, LLC

(57)          ABSTRACT

A display device includes a display panel including touch electrodes, and a touch driving circuit including a driving signal output unit that outputs a touch driving signal supplied to the touch electrodes and a touch control unit that controls the driving signal output unit. The touch control unit sets the touch driving signal to swing between a first voltage and a second voltage higher than the first voltage, set the touch driving signal to rise to a third voltage higher than the second voltage and then lower from the third voltage to the second voltage, during a rising edge period, and set the touch driving signal to fall to a fourth voltage lower than the first voltage and then rise from the fourth voltage to the first voltage, during a falling edge period.

20 Claims, 10 Drawing Sheets

CE : CEa, CEb

DU : SUB, TFTL, EML, TFEL

DISPLAY DEVICE AND MOBILE ELECTRONIC DEVICE INCLUDING SAME

CROSS-REFERENCE TO RELATED APPLICATION

This application claims priority under 35 U.S.C. § 119 to Korean Patent Application No. 10-2023-0151794, filed on Nov. 6, 2023 in the Korean Intellectual Property Office, the contents of which in its entirety are herein incorporated by reference.

TECHNICAL FIELD

The present disclosure relates to a display and, more particularly, to a display device and a mobile electronic device including the same.

DISCUSSION OF THE RELATED ART

As the information society develops, the demand for a display device for displaying an image in various electronic devices is increasing. The display device may be a flat panel display, such as a liquid crystal display (LCD), a field emission display, or a light emitting display panel. Examples of light emitting display panels include an organic light emitting diode (OLED) display device including an organic light emitting diode element as a light emitting element or a light emitting diode display device including an inorganic light emitting diode element such as a light emitting diode (LED) as a light emitting element.

The display panel may include a touch panel as an input device. A touch driving circuit that drives the touch panel generates a touch driving signal for driving touch electrodes of the touch panel. However, the touch driving signal for driving the touch electrodes of the touch panel may cause noise that might give rise to flicker in the display panel.

SUMMARY

A display device includes a display panel including touch electrodes, and a touch driving circuit including a driving signal output unit configured to output a touch driving signal supplied to the touch electrodes and a touch control unit configured to control the driving signal output unit. The touch control unit is further configured to set the touch driving signal to swing between a first voltage and a second voltage that is higher than the first voltage, set the touch driving signal to rise to a third voltage that is higher than the second voltage and then lower from the third voltage to the second voltage, during a rising edge period during which the touch driving signal rises from the first voltage to the second voltage, and set the touch driving signal to fall to a fourth voltage that is lower than the first voltage and then rise from the fourth voltage to the first voltage, during a falling edge period during which the touch driving signal falls from the second voltage to the first voltage.

A period during which the touch driving signal is output may include the rising edge period during which the touch driving signal rises from the first voltage to the third voltage and falls from the third voltage to the second voltage, a high level period during which the touch driving signal maintains the second voltage, the falling edge period during which the touch driving signal falls from the second voltage to the fourth voltage and rises from the fourth voltage to the first voltage, and a low level period during which the touch driving signal maintains the first voltage.

A length of the rising edge period may be shorter than a length of the high level period.

A length of the falling edge period may be shorter than a length of the low level period.

A length of the high level period may be the same as a length of the low level period.

The touch control unit may be configured to set a first voltage difference between the third voltage and the second voltage to about 30% of a second voltage difference between the first voltage and the third voltage.

The touch control unit may be configured to set a third voltage difference between the fourth voltage and the first voltage to about 30% of a fourth voltage difference between the second voltage and the fourth voltage.

The touch control unit may be configured to set the first voltage difference and the third voltage difference to be the same.

The touch driving circuit may further include a charge pump that generates the first voltage, the second voltage, the third voltage, and the fourth voltage.

The touch unit may be set to sense a touch in a capacitive manner.

A mobile electronic device includes a display panel including touch electrodes, and a touch driving circuit including a driving signal output unit that outputs a touch driving signal supplied to the touch electrodes and a touch control unit that controls the driving signal output unit. The touch control unit is configured to set the touch driving signal to swing between a first voltage and a second voltage that is higher than the first voltage, set the touch driving signal to rise to a third voltage that is higher than the second voltage and then lower from the third voltage to the second voltage, during a rising edge period during which the touch driving signal rises from the first voltage to the second voltage, and set the touch driving signal to fall to a fourth voltage that is lower than the first voltage and then rise from the fourth voltage to the first voltage, during a falling edge period during which the touch driving signal falls from the second voltage to the first voltage.

A period during which the touch driving signal is output may include the rising edge period during which the touch driving signal rises from the first voltage to the third voltage and falls from the third voltage to the second voltage, high level period during which the touch driving signal maintains the second voltage, the falling edge period during which the touch driving signal falls from the second voltage to the fourth voltage and rises from the fourth voltage to the first voltage, and low level period during which the touch driving signal maintains the first voltage.

A length of the rising edge period may be shorter than a length of the high level period.

A length of the falling edge period may be shorter than a length of the low level period.

A length of the high level period may be the same as a length of the low level period.

The touch control unit may be configured to set a first voltage difference between the third voltage and the second voltage to about 30% of a second voltage difference between the first voltage and the third voltage.

The touch control unit may be configured to set a third voltage difference between the fourth voltage and the first voltage to about 30% of a fourth voltage difference between the second voltage and the fourth voltage.

The touch control unit may be configured to set the first voltage difference and the third voltage difference to be the same.

The touch driving circuit may further include a charge pump that generates the first voltage, the second voltage, the third voltage, and the fourth voltage.

The touch unit may be set to sense a touch in a capacitive manner.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms are used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
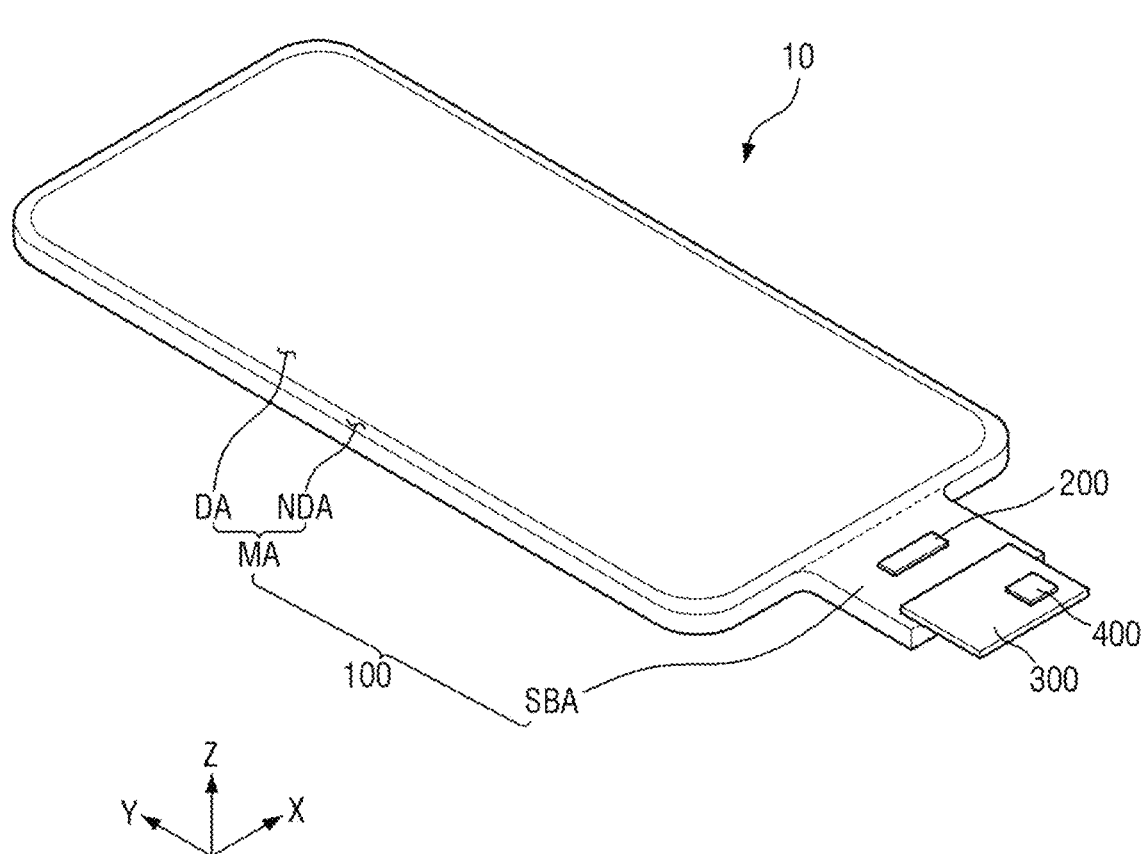
FIG. 1 is a schematic perspective view of a display device according to an exemplary embodiment of the present disclosure.
Figure 2:
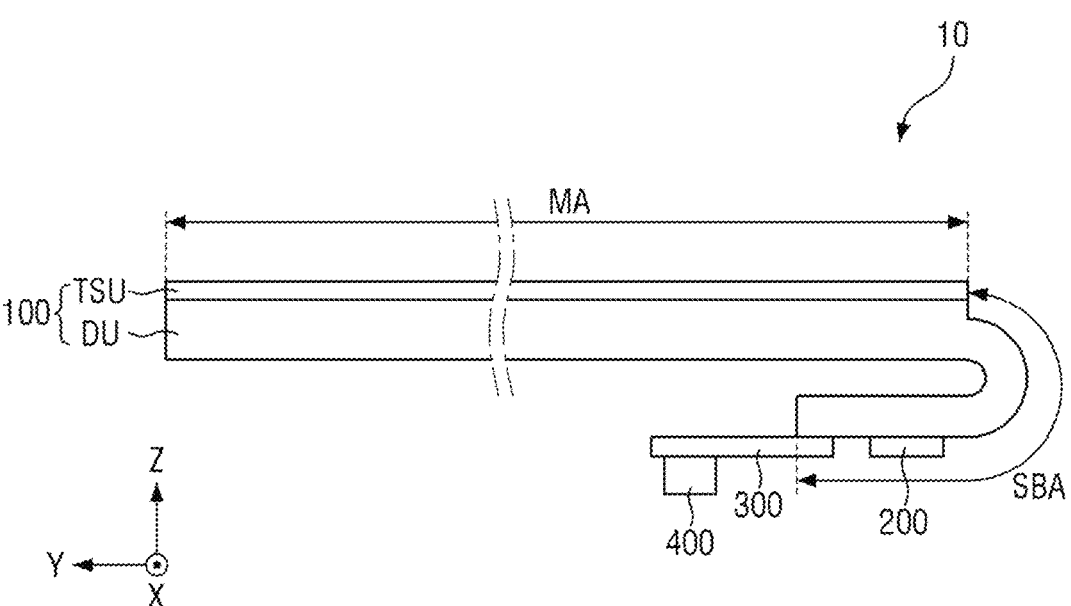
FIG. 2 is a schematic cross-sectional view of the display device according to an exemplary embodiment of the present disclosure.

FIG. 1 is a schematic plan view of a display device according to an embodiment of the present disclosure. FIG. 2 is a schematic cross-sectional view of the display device according to an exemplary embodiment of the present disclosure.

In the drawings, a first direction X is a direction parallel to one side of a display device 10 in a plan view, and refers to a direction of a pair of short sides of the display device 10. A second direction Y is a direction parallel to the other side in contact with one side of the display device 10 in a plan view, and refers to a direction of a pair of long sides of the display device 10. A third direction Z may refer to a thickness direction of the display device 10. However, it should be understood that the directions mentioned in the exemplary embodiments refer to relative directions, and the exemplary embodiments are not necessarily limited to the mentioned directions.

The display device 10 may include various electronic devices that provide a display screen. For example, the display device 10 may be applied to portable electronic devices such as mobile phones, smartphones, tablet personal computers (PCs), mobile communication terminals, electronic notebooks, electronic books, portable multimedia players (PMPs), navigation systems, and ultra mobile PCs (UMPCs). For example, the display device 10 may be applied to a display unit DU of a television, a laptop computer, a computer monitor, a digital billboard, or the Internet of Things (IoT) device. In addition, the display device 10 may be applied to wearable devices such as smart watches, watch phones, glasses-type displays, and head mounted displays (HMDs).

Referring to FIG. 1, the display device 10 may be formed in a planar shape similar to a quadrilateral. For example, the display device 10 may have a planar shape similar to a quadrilateral having a pair of short sides extending in a first direction X and a pair of long sides extending in a second direction Y. A corner where a short side extending in the first direction X and a long side extending in the second direction Y meet may be rounded to have a predetermined curvature or may have a right angled shape. The planar shape of the display device 10 is not necessarily limited to the quadrilateral, and may have a shape similar to other polygons, circles, or ovals.

At least one of the front and rear surfaces of the display device 10 may be a display surface. Here, the "front surface" refers to a surface positioned on one side of one plane and positioned in the third direction Z in the drawing, and the "rear surface" refers to a surface positioned on the other side of one plane and positioned in a direction opposite to the third direction Z in the drawing. The display device 10 may be a double-sided display device 10 in which display is performed on both the front and rear surfaces, but hereinafter, an exemplary embodiment in which the display surface is positioned on the front surface of the display device 10 will be mainly described.

The display device 10 includes a display panel 100 that provides a display screen, a display driving circuit 200, a circuit board 300, and a touch driving circuit 400. The touch driving circuit 400 is a component configured to sense a user's touch input and may be referred to as a "touch sensing device."

The display panel 100 may be formed in a planar shape similar to a quadrilateral. For example, the display panel 100 may have a planar shape similar to a quadrilateral having a pair of short sides extending in the first direction X and a pair of long sides extending in the second direction Y. A corner where a short side extending in the first direction X and a long side extending in the second direction Y meet may be rounded to have a predetermined curvature or may have a right angled shape. The planar shape of the display panel 100 is not necessarily limited to the quadrilateral, and may have a shape similar to other polygons, circles, or ovals. In addition, the display panel 100 may also be flexible so as to be bent or curved to a noticeable extent without cracking or otherwise sustaining damage thereto.

The display panel 100 may include a main area MA and a sub-area SBA.

The main area MA may include a display area DA including pixels displaying an image, and a non-display area NDA disposed around the display area DA and at least partially surrounding the display area DA. The display area DA may emit light from a plurality of light emitting areas or a plurality of opening areas. For example, the display panel 100 may include a pixel circuit including switching elements, a pixel defining film defining the light emitting areas or the opening areas, and a self-light emitting element.

The non-display area NDA may be an area outside the display area DA. The non-display area NDA may be defined as an edge area of the main area MA of the display panel 100. The non-display area NDA may include a gate driver that supplies gate signals to gate lines of the display panel 100.

The sub-area SBA may extend from one side of the main area MA. The sub-area SBA may be bent to overlap the main area MA in a third direction Z. The sub-area SBA may include a pad portion connected to the display driving circuit 200 and the circuit board 300.

Referring to FIG. 2, the display panel 100 includes a display unit DU and a touch unit TSU.

Figure 3:
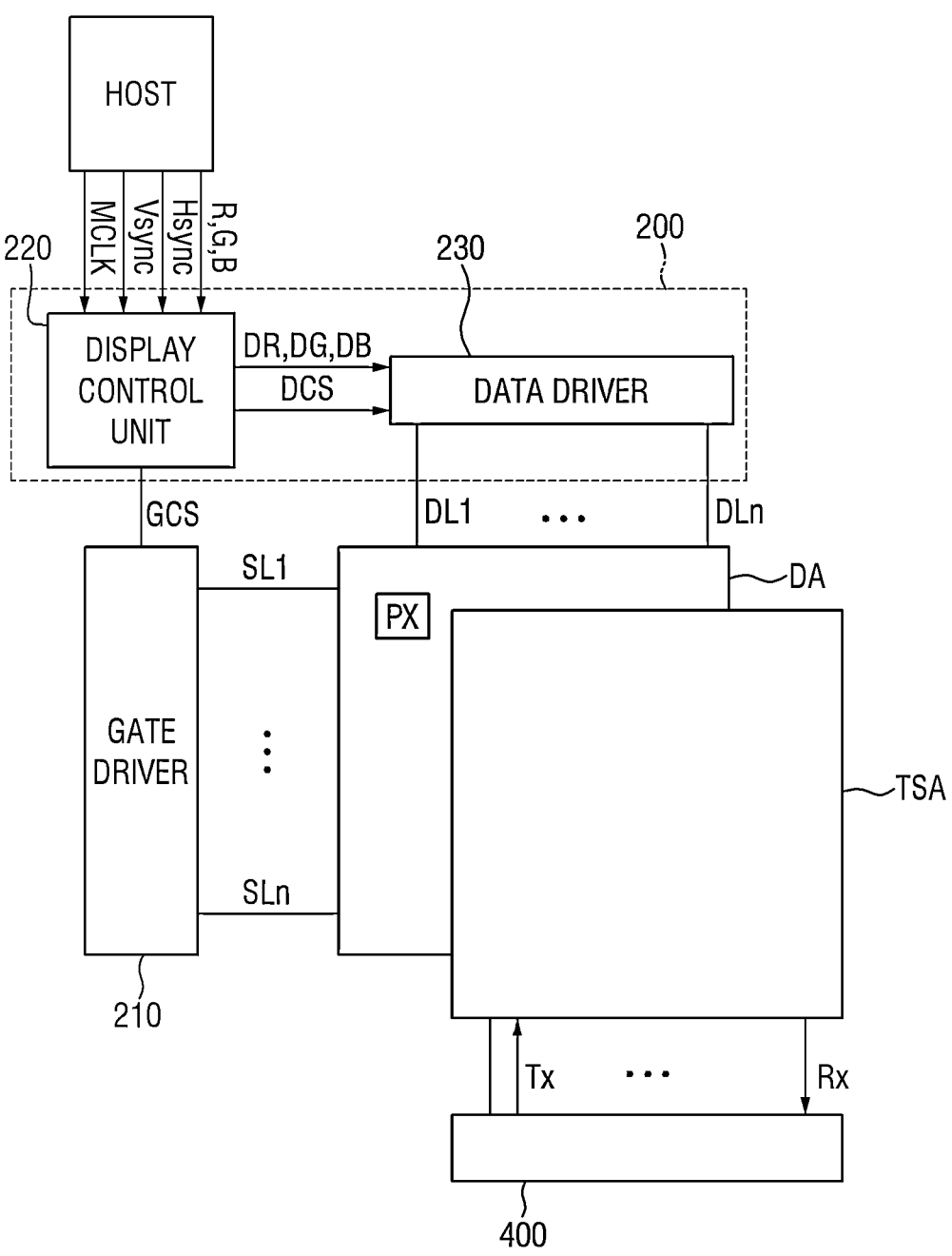
FIG. 3 is a conceptual view of a display unit and a touch driver according to an exemplary embodiment of the present disclosure.

The display unit DU may include a plurality of pixels (PX in FIG. 3). The pixel PX is a basic unit for displaying an image on a screen. One pixel PX may include, but is not necessarily limited to including, a red sub-pixel, a green sub-pixel, and a blue sub-pixel. The plurality of pixels PX may be alternately arranged in a plan view. For example, the pixels PX may be arranged in a matrix direction, but are not necessarily limited thereto.

The touch unit TSU may be disposed on the display unit DU, but the present disclosure is not necessarily limited thereto. For example, the touch unit TSU may be formed like the display unit DU using an in-cell touch method. The touch unit TSU may include a plurality of touch electrodes (SEN in FIG. 5) for sensing a user's touch in a capacitive manner, a plurality of touch driving lines (TL in FIG. 5) connecting the plurality of touch electrodes SEN and the touch driving circuit 400, and the plurality of touch sensing lines (RL in FIG. 5). The touch unit TSU, which is a layer that recognizes a touch input, may function as a touch member. The touch unit TSU may determine whether the touch input has been made and calculate a corresponding position as touch input coordinates. A detailed description of the display unit DU and the touch unit TSU will be described later with reference to FIGS. 4 to 7.

The display unit DU and the touch unit TSU may also overlap each other. For example, the display area DA may be an area that displays a screen and may be an area that senses a touch input.

The sub-area SBA of the display panel 100 may extend from one side of the main area MA. The sub-area SBA may include a flexible material that may be bent, folded, rolled, or the like. For example, a portion of the sub-area SBA may be bent on one side of the main area MA, and another portion of the sub-area SBA extending from the bent portion of the sub-area SBA may overlap the main area MA in a third direction (Z-axis direction). The sub-area SBA may include a pad portion connected to the display driving circuit 200 and the circuit board 300.

Referring to FIG. 1, the display driving circuit 200 may be disposed in the sub-area SBA of the display panel 100. In addition, the display driving circuit 200 may be formed as an integrated circuit (IC) and mounted on the display panel 100 by a chip-on-plastic (COP) method or a chip-on-glass (COG) method.

The display driving circuit 200 may output data signals and voltages for driving the display panel 100. The display driving circuit 200 may supply data voltages to data lines of the display panel 100. The display driving circuit 200 may supply a power voltage to a power line of the display panel 100 and may supply gate control signals to a gate driver.

The circuit board 300 may be disposed in the sub-area SBA of the display panel 100. Lead lines of the circuit board 300 may be electrically connected to the pad portion of the display panel 100. The circuit board 300 may be a flexible film such as a flexible printed circuit board, a printed circuit board, or a chip on film.

The circuit board 300 may include a plurality of conductive lines for transmitting signals from a main circuit board to the display driving circuit 200, or electrically connecting the touch driving circuit 400 to a plurality of first electrodes TE and a plurality of second electrodes RE of the touch unit TSU.

In the present document, the first electrode TE may be referred to by terms such as "touch driving electrode." In the present document, the second electrode RE may be referred to by terms such as "touch sensing electrode."

The touch driving circuit 400 may be disposed in the sub-area SBA of the display panel 100. Alternatively, the touch driving circuit 400 may be mounted on the circuit board 300.

The touch driving circuit 400 may determine whether a touch input is made and calculate touch coordinates, based on sensing the amount of change in capacitance between the plurality of touch electrodes. The touch driving circuit 400 may be formed as an integrated circuit (IC) and mounted on the display panel 100 by a chip-on-plastic (COP) method or a chip-on-glass (COG) method.

Figure 4:
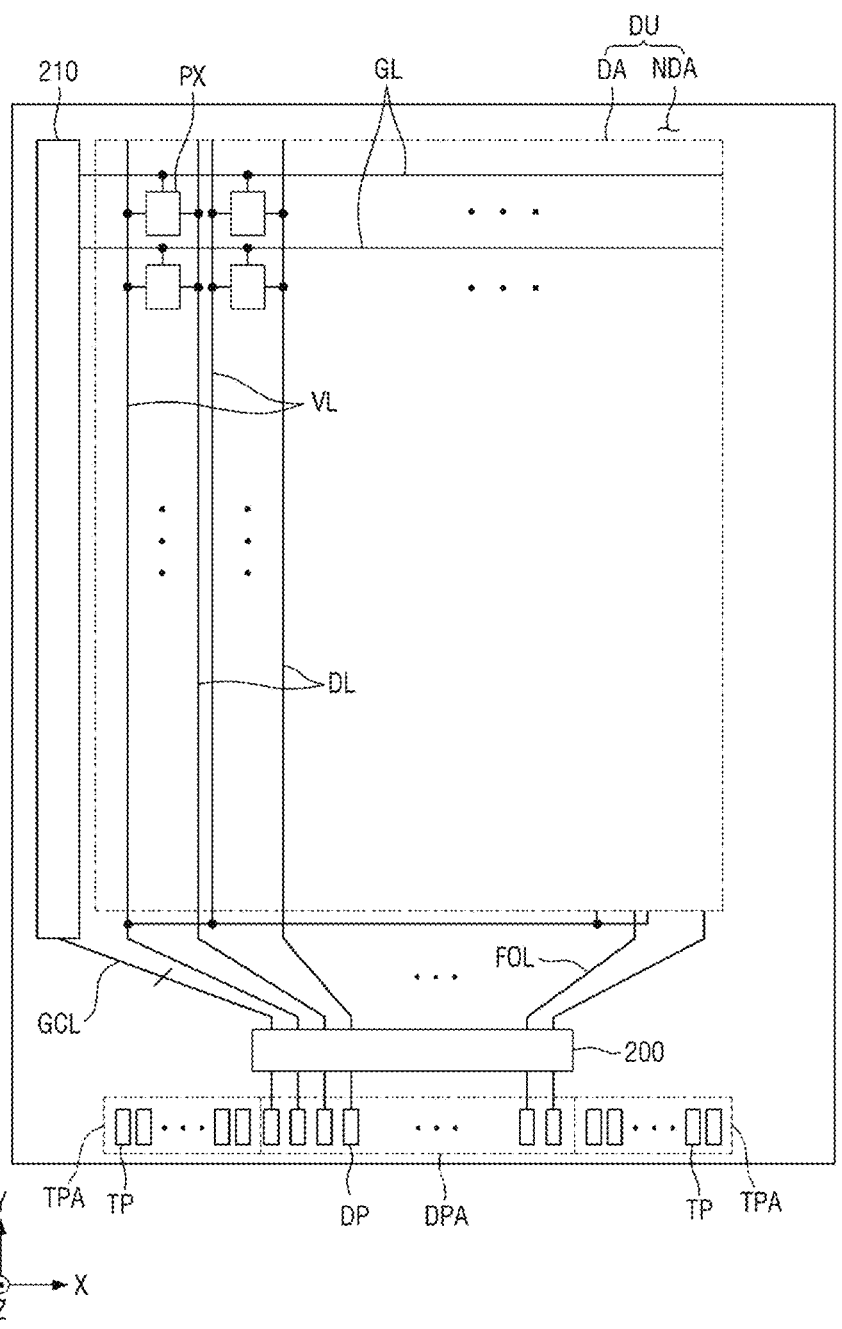
FIG. 4 is a schematic plan view illustrating a display unit of the display device according to an exemplary embodiment of the present disclosure.

FIG. 3 is a conceptual view of a display unit and a touch driver according to an exemplary embodiment of the present disclosure. FIG. 4 is a schematic plan view illustrating a display unit of the display device according to an exemplary embodiment of the present disclosure.

Referring to FIGS. 3 and 4, the display device 10 includes a display panel 100 including a plurality of pixels PX, a display driving circuit 200, and a touch driving circuit 400. The display driving circuit 200 and the touch driving circuit 400 may operate based on a control signal or command signal from a host. For example, the host may be a processor.

According to an exemplary embodiment, the touch driving circuit 400 may be controlled by the display driving circuit 200.

The display driving circuit 200 may include a data driver 230 and a display control unit 220.

The display control unit 220 may receive input data (R, G, and B) and a timing control signal from an external source (e.g., the host). The timing control signal may include a vertical synchronization signal Vsync indicating one frame period, a horizontal synchronization signal Hsync indicating one horizontal period, and a main clock MCLK that repeats at a predetermined period. The input data (R, G, and B) may be RGB data including red image data, green image data, and blue image data. The display control unit 220 may generate output data signals DR, DG, and DB and an internal control signal using the received input data (R, G, and B) and timing control signal. The internal control signal includes a data control signal DCS and a gate control signal GCS.

The display control unit 220 may control an operation of the data driver 230 by providing the data control signal DCS to the data driver 230. The display control unit 220 may control an operation of the gate driver 210 by providing the gate control signal GCS to the gate driver 210.

The data driver 230 may receive the output data signals DR, DG, and DB and the data control signal DCS from the display control unit 220. The data driver 230 may generate a data signal using the received output data signals DR, DG, and DB and data control signal DCS. The data driver 230 may provide the generated data signal to the display panel 100. The data driver 230 may provide the data signal to the plurality of pixels PX through a plurality of data lines DL1 to DLn (e.g., DL in FIG. 4) formed in the display panel 100.

The gate driver 210 may receive the gate control signal GCS from the display control unit 220. The gate driver 210 may generate a gate signal using the received gate control signal GCS. The gate driver 210 may provide the generated gate signal to the display panel 100.

The gate driver 210 may provide the gate signal to the plurality of pixels PX through a plurality of gate lines SL1 to SLn (e.g., GL in FIG. 4) formed in the display panel 100. A detailed description of the plurality of data lines DL1 to DLn and the plurality of gate lines SL1 to SLn will be described later with reference to FIG. 4.

It is illustrated in FIG. 3 that the display driving circuit 200 does not include the gate driver 210, but the present disclosure is not necessarily limited thereto. For example, the gate driver 210 may be included in the display driving circuit 200 that controls the operation of the display panel 100. The gate driver 210, the data driver 230, and the display control unit 220 may be formed as an integrated circuit (IC). The gate driver 210 may be formed during a TFT process of the display panel 100. The display control unit 220 and the data driver 230 may be merged to form a timing controller embedded driver integrated circuit (TED).

The display panel 100 may include a plurality of pixels PX connected to the plurality of data lines (DL in FIG. 4) and the plurality of gate lines (GL in FIG. 4).

A frame frequency at which the display driving circuit 200 drives the display panel 100 may be variable. For example, the frame frequency may vary within the range of 1 Hz to 240 Hz depending on the selection of the host or the user. The display driving circuit 200 may drive at 60 Hz for one period and change the frame frequency to 120 Hz for another period depending on the user's needs.

Figure 5:
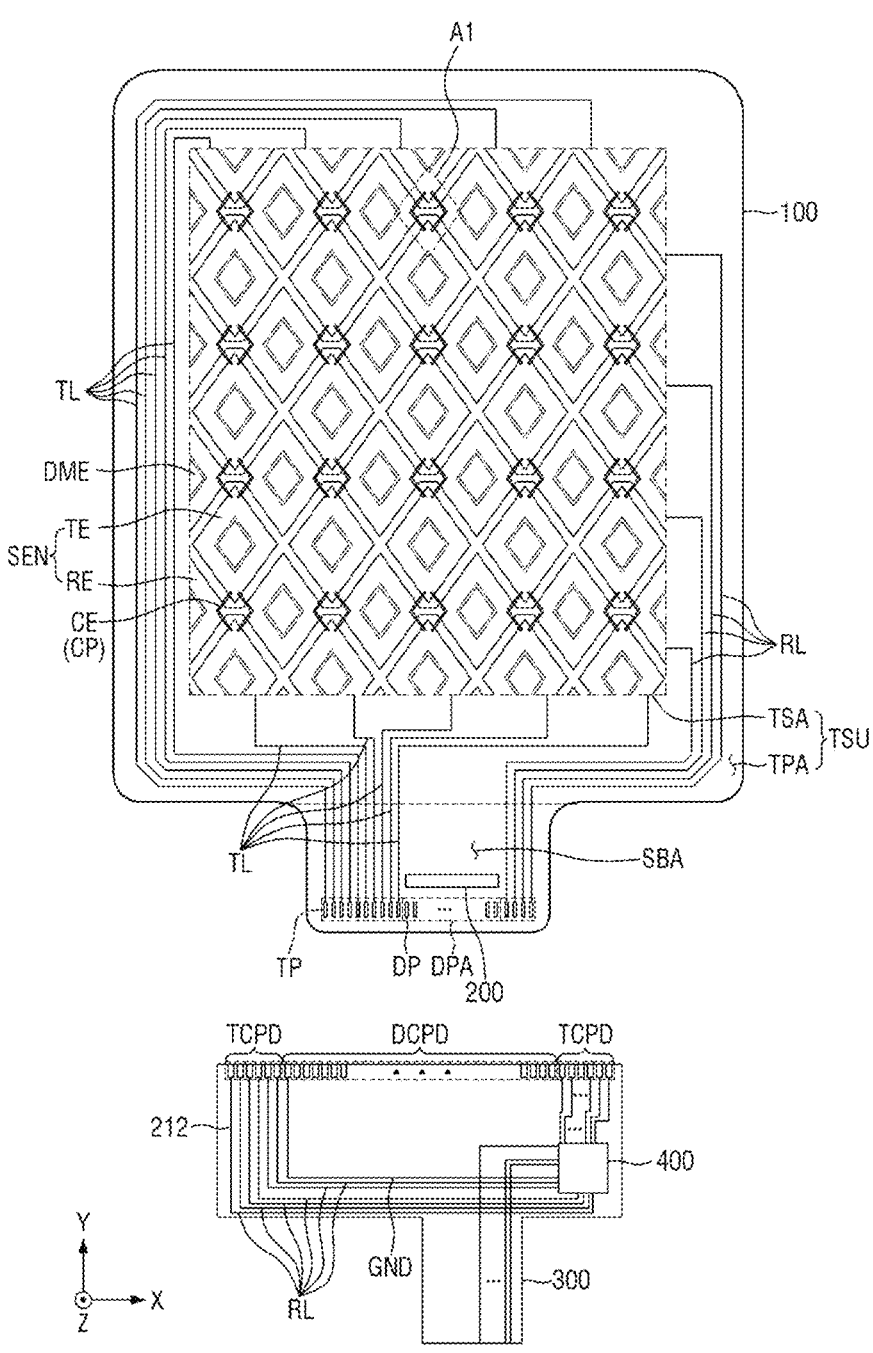
FIG. 5 is a plan view illustrating a touch unit of the display device according to an exemplary embodiment of the present disclosure.

A touch sensing area TSA may include a plurality of first electrodes (TE in FIG. 5) and second electrodes (RE in FIG. 5), and a plurality of touch driving lines (TL in FIG. 5) and touch sensing lines (RL in FIG. 5). The touch sensing area TSA may sense a touch input by being applied with an electrical signal Tx from the touch driving circuit 400 disposed on the circuit board 300 through the plurality of touch driving lines TL, or transmitting an electrical signal Rx sensed from the plurality of second electrodes RE to the touch driving circuit 400 through the plurality of touch sensing lines RL. For example, the touch driving circuit 400 may sense the touch input by converting an analog electrical signal sensed in the touch sensing area TSA into a digital signal. A detailed description of the touch driving circuit 400 will be provided later with reference to FIG. 5.

Referring to FIG. 4, the display unit DU may include a display area DA and a non-display area NDA. The display unit DU may include a plurality of sub-pixels PX, and a plurality of gate lines GL and a plurality of data lines DL connected to the plurality of sub-pixels PX.

The plurality of gate lines GL may supply the gate signal received from the gate driver 210 to the plurality of sub-pixels PX. The plurality of gate lines GL may extend in the first direction X and may be spaced apart from each other in the second direction Y intersecting the first direction X.

The plurality of data lines DL (e.g., DL1 to DLn in FIG. 3) may supply the output data signals DR, DG, and DB and the data signal received from the display driving circuit 200 to the plurality of sub-pixel PX. The plurality of data lines DL may extend in the second direction Y and may be spaced apart from each other in the first direction X.

The non-display area NDA may at least partially surround the display area DA. For example, the non-display area NDA may include a gate driver 210 applying the gate signals to the plurality of gate lines GL (e.g., SL1 to SLn in FIG. 3), fan-out lines FOL connecting the plurality of data lines DL and the display driving circuit 200, and a display pad portion DP connected to the circuit board 300.

The display driving circuit 200 may supply the gate control signal GCS to the gate driver 210 through the gate control line GCL. The gate driver 210 may generate a plurality of gate signals based on gate control signal GCS, and may sequentially supply the plurality of gate signals to the plurality of gate lines GL according to a set order.

The display driving circuit 200 may supply a first power voltage to first power lines VL and a second power voltage to second power lines through the data driver 230. Each of the plurality of sub-pixels PX may be supplied with the first power voltage through the first power line VL and the second power voltage through the second power line. The first power voltage may be a predetermined high level voltage, and the second power voltage may be a voltage that is lower than the first power voltage.

The display pad area DPA and the touch peripheral area TPA may be disposed at an edge of the display panel 100. The display pad area DPA may include a plurality of display pad portions DP. The plurality of display pad portions DP may be connected to a main processor through the circuit board 300. The plurality of display pad portions DP may be connected to the circuit board 300 to receive digital video data and supply the digital video data to the display driving circuit 200.

FIG. 5 is a plan view illustrating a touch unit of the display device according to an exemplary embodiment of the present disclosure.

Referring to FIG. 5, the touch unit TSU may include a touch sensing area TSA for sensing a user's touch, and a touch peripheral area TPA disposed around the touch sensing area TSA. The touch sensing area TSA may overlap the display area DA of the display panel 100, and the touch peripheral area TPA may overlap the non-display area NDA of the display panel 100.

The touch unit TSU may include a plurality of first electrodes TE, a plurality of second electrodes RE, a plurality of touch driving lines TL, and a plurality of touch sensing lines RL.

The circuit board 300 may include first circuit pad portions DCPD connected to the display pad portions DP of the display panel 100, second circuit pad portions TCPD connected to the touch pad portions TP of the display panel 100, and touch circuit lines 212 connecting the second circuit pad portions TCPD and the touch driving circuit 400.

The touch sensing area TSA includes a plurality of first electrodes TE and a plurality of second electrodes RE as touch electrodes SEN. The plurality of first electrodes TE and the plurality of second electrodes RE may be electrically connected to the touch driving circuit 400 of the circuit board 300. The touch sensing area TSA may be applied with an electrical signal from the touch driving circuit 400 disposed on the circuit board 300 through the plurality of touch driving lines TL and touch sensing lines RL, or transmitting an electrical signal sensed from the plurality of first electrodes TE and second electrodes RE to the touch driving circuit 400 through the plurality of touch driving lines TL and touch sensing lines RL.

The plurality of first electrodes TE may be arranged in the first direction X and the second direction Y. The plurality of first electrodes TE may be spaced apart from each other in the first direction X and the second direction Y. The first electrodes TE adjacent to each other in the second direction Y may be electrically connected to each other through a bridge electrode CE.

The plurality of first electrodes TE may be connected to a touch pad portion TP through the touch driving line TL. Some of the plurality of touch driving lines TL may extend to the touch pad portion TP via a lower side of the touch peripheral area TPA. Other of the plurality of touch driving lines TL may extend to the touch pad portion TP via upper, left, and lower sides of the touch peripheral area TPA. The touch pad portion TP may be connected to the touch driving circuit 400 through the circuit board 300.

The display pad area DPA and the touch pad area TPA may be disposed at an edge of the display panel 100. The display pad area DPA and the touch pad area TPA may be electrically connected to the circuit board 300 using a low-resistance, high-reliability material such as an anisotropic conductive film.

The plurality of second electrodes RE may extend in the first direction X and may be spaced apart from each other in the second direction Y. The plurality of second electrodes RE may be arranged in the first direction X and the second direction Y, and the plurality of second electrodes RE adjacent to each other in the first direction X may be electrically connected to each other through the connection portion.

The plurality of second electrodes RE may be connected to the touch pad portion TP through the touch sensing line RL. For example, the plurality of second electrodes RE disposed on the right side of the touch sensing area TSA may be connected to the touch pad portion TP through the plurality of touch sensing lines RL. The plurality of touch sensing lines RL may extend to the touch pad portion TP via the right and lower sides of the touch peripheral area TPA. The touch pad portion TP may be connected to the touch driving circuit 400 through the circuit board 300.

As the plurality of first electrodes TE and second electrodes RE include a planar pattern made of a transparent conductive layer or include a mesh-like pattern in which an opaque metal is applied along an area where the light emitting element is not disposed, the plurality of first electrodes TE and second electrodes RE might not block the travel of light emitted from the display area DA.

A touch driving signal (TDS in FIG. 10) may be applied to each of the plurality of first electrodes TE from the touch driving circuit 400 through any one of the plurality of touch driving lines TL. When the touch driving signal TDS is applied to the plurality of first electrodes TE, mutual capacitance may be formed between the first electrode TE and the second electrode RE adjacent to each other. When a touch input occurs from the outside, the mutual capacitance value between the first electrode TE and the second electrode RE adjacent to each other may change. The change in the mutual capacitance value between the first electrode TE and the second electrode RE adjacent to each other may be transmitted to the touch driving circuit 400 through the plurality of touch sensing lines RL. Accordingly, the touch driving circuit 400 may determine whether the touch input is made and calculate a corresponding position as touch input coordinates. The touch sensing may be achieved through a mutual capacitance method, but is not necessarily limited thereto.

It is mainly described in the present document that the touch is sensed by sensing the mutual capacitance between the first electrode TE and the second electrode RE, but the present disclosure is not necessarily limited thereto. For example, the touch unit TSU of the present disclosure may sense a touch using a self-capacitance method.

The symbol GND not described in FIG. 5 may be a ground line formed on the circuit board 300.

The symbol DME not described in FIG. 5 may be a dummy electrode. The plurality of first electrodes TE, the plurality of second electrodes RE, and the plurality of dummy electrodes DME may be disposed on the same layer and may be spaced apart from each other.

Figure 6:
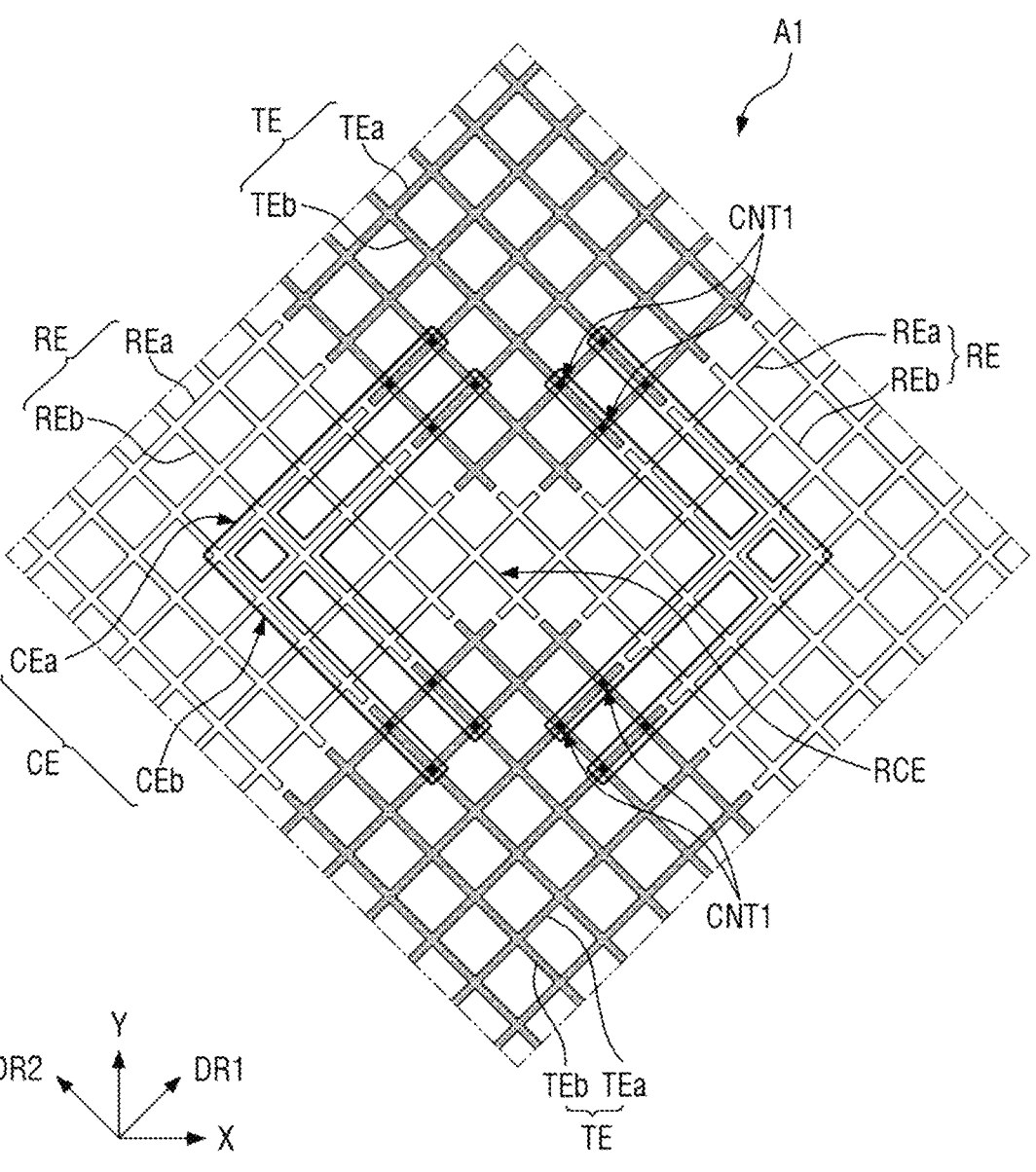
FIG. 6 is an enlarged view of area A1 of FIG. 5.
Figure 7:
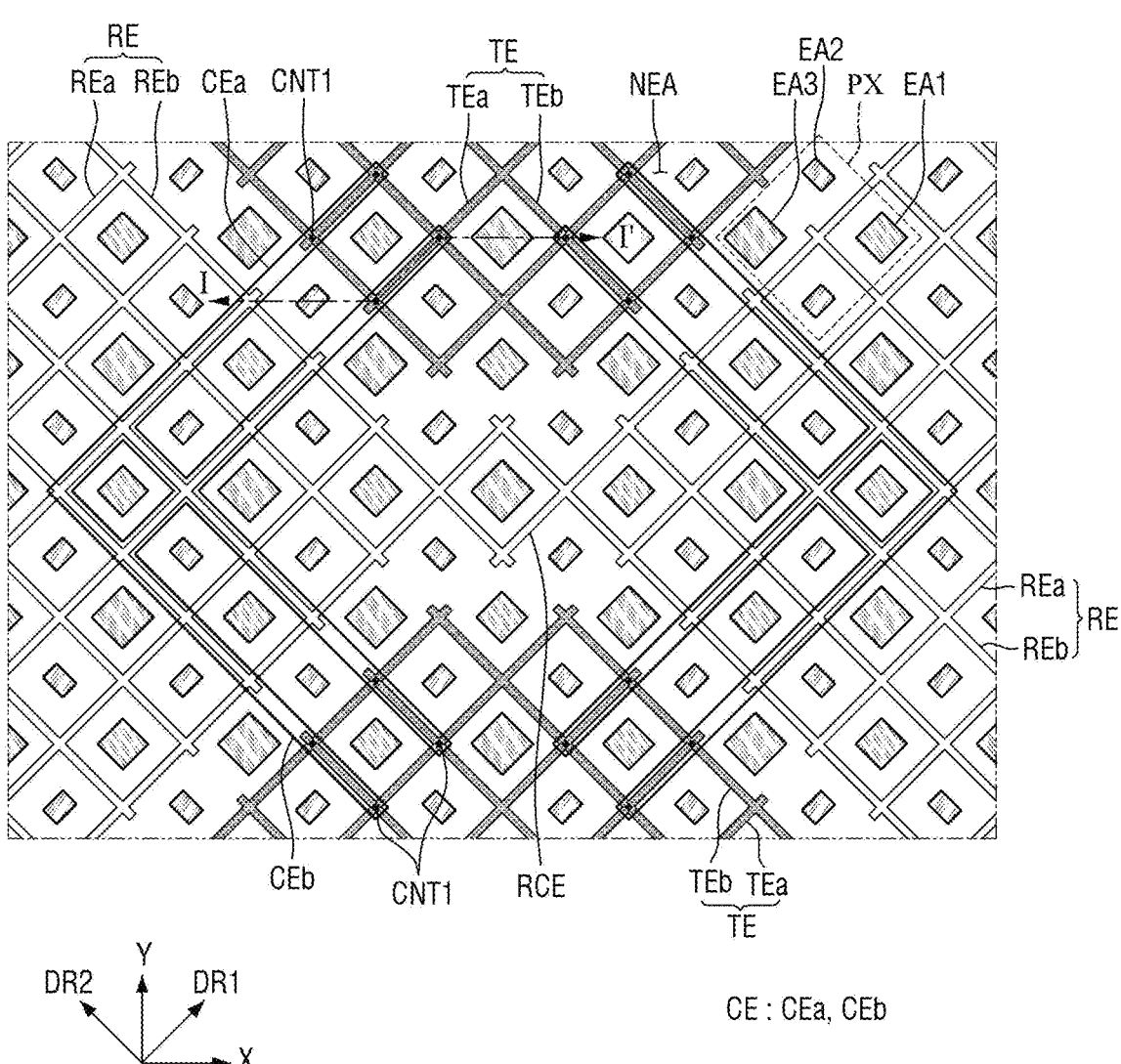
FIG. 7 is an enlarged view illustrating a portion of the display device according to an exemplary embodiment of the present disclosure.

FIG. 6 is an enlarged view of area A1 of FIG. 5. FIG. 7 is an enlarged view illustrating a portion of the display device according to an exemplary embodiment of the present disclosure. Referring to FIGS. 6 and 7, the plurality of first electrodes TE may be arranged in the first direction X and the second direction Y. The plurality of first electrodes TE may be spaced apart from each other in the first direction X and the second direction Y. The first electrodes TE adjacent to each other in the second direction Y may be electrically connected to each other through a bridge electrode CE.

The plurality of second electrodes RE may extend in the first direction X and may be spaced apart from each other in the second direction Y. The plurality of second electrodes RE may be arranged in the first direction X and the second direction Y, and the second electrodes RE adjacent to each other in the first direction X may be electrically connected to each other through a connection portion RCE. For example, the connection portion RCE of the second electrodes RE may cross between the first electrodes TE adjacent to each other.

A plurality of bridge electrodes CE may be disposed on a layer different from that of the first electrodes TE and the second electrodes RE. The bridge electrode CE may include a first portion CEa and a second portion CEb. For example, the second portion CEb of the bridge electrode CE may be connected to the first electrode TE disposed on one side through a first contact hole CNT1 and extend in the other direction DR2. The first portion CEa of the bridge electrode CE may be bent from the second portion CEb in an area overlapping the second electrode RE to extend in one direction DR1, and may be connected to the first electrode TE disposed on the other side through the first contact hole CNT1. One direction DR1 may be a direction between the first direction X and the second direction Y, and the other direction DR2 may be a direction intersecting the one direction DR1. For example, each of the plurality of bridge electrodes CE may connect the first electrodes TE adjacent to each other in the second direction Y.

According to an exemplary embodiment, the plurality of first electrodes TE, the plurality of second electrodes RE, and the plurality of dummy electrodes (DME in FIG. 5) may be formed in a mesh structure or a net structure in a plan view. The plurality of first electrodes TE, the plurality of second electrodes RE, and the plurality of dummy electrodes (DME in FIG. 5) might not overlap the first to third light emitting areas EA1, EA2, and EA3 and may instead overlap a non-emitting area NEA. The plurality of bridge electrodes CE might not overlap the first to third light emitting areas EA1, EA2, and EA3. Therefore, the display device 10 may prevent luminance of light emitted from the first to third light emitting areas EA1, EA2, and EA3 from being reduced by the touch unit TSU.

Each of the plurality of first electrodes TE may include a first portion TEa extending in one direction DR1 and a second portion TEb extending in the other direction DR2. Each of the plurality of second electrodes RE may include a first portion REa extending in one direction DR1 and a second portion REb extending in the other direction DR2.

According to an exemplary embodiment, the plurality of first electrodes TE, the plurality of second electrodes RE, and the plurality of dummy electrodes (DME in FIG. 5) may be formed in a full-surface structure rather than a mesh structure or a net structure in a plan view. In this case, the plurality of first electrodes TE, the plurality of second electrodes RE, and the plurality of dummy electrodes (DME in FIG. 5) may include a transparent conductive material having high light transmittance, such as indium tin oxide (ITO) or indium zinc oxide (IZO).

The plurality of pixels PX may include first to third sub-pixels, and each of the first to third sub-pixels may include first to third light emitting areas EA1, EA2, and EA3. For example, the first light emitting area EA1 may emit light of a first color or red light, the second light emitting area EA2 may emit light of a second color or green light, and the third light emitting area EA3 may emit light of a third color or blue light, but the present disclosure is not necessarily limited thereto.

One pixel PX may express a white grayscale by including one first light emitting area EA1, two second light emitting areas EA2, and one third light emitting area EA3. Therefore, the white grayscale may be expressed by a combination of light emitted from one first light emitting area EA1, light emitted from two second light emitting areas EA2, and light emitted from one third light emitting area EA3.

Figure 8:
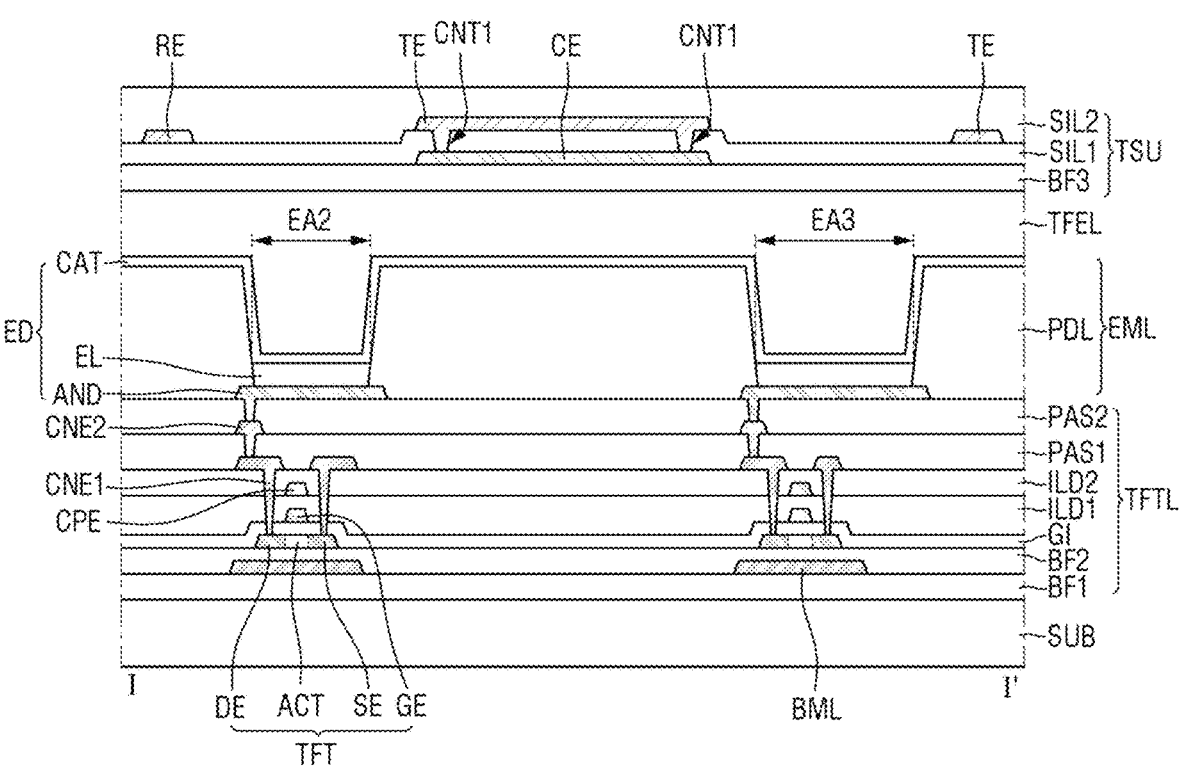
FIG. 8 is a cross-sectional view of the display device according to an exemplary embodiment of the present disclosure taken along line I-I' of FIG. 7.

FIG. 8 is a cross-sectional view taken along line I-I' of FIG. 7.

Referring to FIG. 8, the display panel 100 may include a display unit DU and a touch unit TSU. The display unit DU may include a substrate SUB, a thin film transistor layer TFTL, a light emitting element layer EML, and an encapsulation layer TFEL.

The substrate SUB may support the display panel 100. The substrate SUB may be a base substrate or a base member, and may be made of an insulating material such as a polymer resin. For example, the substrate SUB may be a flexible substrate that may be bent, folded, and/or rolled to a noticeable extent without cracking or otherwise sustaining damage. As an example, the substrate SUB may include a flexible material and a rigid material.

The thin film transistor layer TFTL may include first and second buffer layer BF1 and BF2, a thin film transistor TFT, a gate insulating film GI, a first interlayer insulating film ILD1, a capacitor electrode CPE, a second interlayer insulating film ILD2, a first connection electrode CNE1, a first passivation layer PAS1, a second connection electrode CNE2, and a second passivation layer PAS2.

The first buffer layer BF1 may be disposed on the substrate SUB. The first buffer layer BF1 may include an inorganic film capable of preventing permeation of air or moisture. For example, the first buffer layer BF1 may include a plurality of inorganic films alternately stacked.

A light blocking layer BML may be disposed on the first buffer layer BF1. For example, the light blocking layer BML may be formed as a single layer or a multi-layer made of any one of molybdenum (Mo), aluminum (Al), chromium (Cr), gold (Au), titanium (Ti), nickel (Ni), neodymium (Nd), and copper (Cu), or an alloy thereof. As another example, the light blocking layer BML may be an organic film including black pigment.

The second buffer layer BF2 may cover the first buffer layer BF1 and the light blocking layer BML. The second buffer layer BF2 may include an inorganic film capable of preventing permeation of air or moisture. For example, the second buffer layer BF2 may include a plurality of inorganic films alternately stacked.

The thin film transistor TFT may be disposed on the second buffer layer BF2, and may constitute a pixel circuit of each of the plurality of pixels. For example, the thin film transistor TFT may be a driving transistor or a switching transistor of the pixel circuit. The thin film transistor TFT may include a semiconductor region ACT, a gate electrode GE, a source electrode SE, and a drain electrode DE.

The semiconductor region ACT, the source electrode SE, and the drain electrode DE may be disposed on the second buffer layer BF2. The semiconductor region ACT may overlap the gate electrode GE in the thickness direction, and may be insulated from the gate electrode GE by the gate insulating film GI. The source electrode SE and the drain electrode DE may be formed by making a material of the semiconductor region ACT into a conductor.

The gate electrode GE may be disposed on the gate insulating film GI. The gate electrode GE may overlap the semiconductor region ACT with the gate insulating film GI interposed therebetween.

The gate insulating film GI may be disposed on the semiconductor region ACT, the source electrode SE, and the drain electrode DE. For example, the gate insulating film GI may cover the semiconductor region ACT, the source electrode SE, the drain electrode DE, and the second buffer layer BF2, and may insulate the semiconductor region ACT and the gate electrode GE from each other. The gate insulating film GI may include a contact hole through which the first connection electrode CNE1 penetrates.

The first interlayer insulating film ILD1 may cover the gate electrode GE and the gate insulating film GI. The first interlayer insulating film ILD1 may include a contact hole through which the first connection electrode CNE1 penetrates. The contact hole of the first interlayer insulating film ILD1 may be connected to the contact hole of the gate insulating film GI and a contact hole of the second interlayer insulating film ILD2.

The capacitor electrode CPE may be disposed on the first interlayer insulating film ILD1. The capacitor electrode CPE may overlap the gate electrode GE in the third direction (Z-axis direction).

The second interlayer insulating film ILD2 may cover the capacitor electrode CPE and the first interlayer insulating film ILD1. The second interlayer insulating film ILD2 may include a contact hole through which the first connection electrode CNE1 penetrates. The contact hole of the second interlayer insulating film ILD2 may be connected to the contact hole of the first interlayer insulating film ILD1 and the contact hole of the gate insulating film GI.

The first connection electrode CNE1 may be disposed on the second interlayer insulating film ILD2. The first connection electrode CNE1 may connect the drain electrode DE of the thin film transistor TFT and the second connection electrode CNE2 to each other. The first connection electrode CNE1 may be inserted into the contact holes formed in the second interlayer insulating film ILD2, the first interlayer insulating film ILD1, and the gate insulating film GI and be in contact with the drain electrode DE of the thin film transistor TFT.

The first passivation layer PAS1 may cover the first connection electrode CNE1 and the second interlayer insulating film ILD2. The first passivation layer PAS1 may protect the thin film transistor TFT. The first passivation layer PAS1 may include a contact hole through which the second connection electrode CNE2 penetrates.

The second connection electrode CNE2 may be disposed on the first passivation layer PAS1. The second connection electrode CNE2 may connect the first connection electrode CNE1 and a first electrode AND of a light emitting element ED to each other. The second connection electrode CNE2 may be inserted into the contact hole formed in the first passivation layer PAS1 and be in contact with the first connection electrode CNE1.

The second passivation layer PAS2 may cover the second connection electrode CNE2 and the first passivation layer PAS1. The second passivation layer PAS2 may include a contact hole through which the first electrode AND of the light emitting element ED penetrates.

A light emitting element layer EML may be disposed on the thin film transistor layer TFTL. The light emitting element layer EML may include a light emitting element ED and a pixel defining film PDL. The light emitting element ED may include a first electrode AND, a light emitting layer EL, and a second electrode CAT.

The first electrode AND may be disposed on the second passivation layer PAS2. The first electrode AND may overlap one of the first to third light emitting areas LA1, LA2, and LA3 defined by the pixel defining film PDL. The first electrode AND may be connected to the drain electrode DE of the thin film transistor TFT through the first and second connection electrodes CNE1 and CNE2.

The light emitting layer EL may be disposed on the first electrode AND. For example, the light emitting layer EL may be an organic light emitting layer made of an organic material, but is not necessarily limited thereto. In the case in which the light emitting layer EL corresponds to the organic light emitting layer, when the thin film transistor TFT applies a predetermined voltage to the first electrode AND of the light emitting element ED and the second electrode CAT of the light emitting element ED receives a common voltage or a cathode voltage, each of the holes and electrons may move to the organic light emitting layer EL through a hole transporting layer and an electron transporting layer, and the holes and electrons may combine with each other in the organic light emitting layer EL to emit light.

The second electrode CAT may be disposed on the light emitting layer EL. For example, the second electrode CAT may be implemented in the form of an electrode that commonly covers all pixels without being differentiated for each of the plurality of pixels. For example, the second electrode CAT may be disposed on the light emitting layer EL in the first to third light emitting areas EA1, EA2, and EA3, and may be disposed on the pixel defining film PDL in an area excluding the first to third light emitting areas EA1, EA2, and EA3.

The pixel defining film PDL may define the first to third light emitting areas EA1, EA2, and EA3. The pixel defining film PDL may separate and insulate the first electrodes AND of the plurality of light emitting elements ED from each other.

The encapsulation layer TFEL may be disposed on the second electrode CAT to cover the plurality of light emitting elements ED. The encapsulation layer TFEL may include at least one inorganic film to prevent oxygen or moisture from permeating into the light emitting element layer EML. The encapsulation layer TFEL may include at least one organic film to protect the light emitting element layer EML from foreign substances such as dust.

The touch unit TSU may be disposed on the encapsulation layer TFEL. The touch unit TSU may include a third buffer layer BF3, a bridge electrode CE, a first insulating layer SIL1, a first electrode TE, a second electrode RE, and a second insulating layer SIL2.

The third buffer layer BF3 may be disposed on the encapsulation layer TFEL. The third buffer layer BF3 may have insulation and optical functions. The third buffer layer BF3 may include at least one inorganic film. Optionally, the third buffer layer BF3 may be omitted.

The bridge electrode CE may be disposed on the third buffer layer BF3. The bridge electrode CE may be disposed on a different layer from the first electrode TE and the second electrode RE to connect the first electrodes TE adjacent to each other in the second direction (e.g., the second direction Y in FIG. 7). For example, the bridge electrode CE may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The first insulating layer SIL1 may cover the bridge electrode CE and the third buffer layer BF3. The first insulating layer SIL1 may have insulation and optical functions. For example, the first insulating layer SIL1 may be formed as an inorganic film, for example, a silicon nitride layer, a silicon oxynitride layer, a silicon oxide layer, a titanium oxide layer, or an aluminum oxide layer.

The first electrode TE and the second electrode RE may be disposed on the first insulating layer SIL1. Each of the first electrode TE and the second electrode RE might not overlap the first to third light emitting areas EA1, EA2, and EA3. Each of the first electrode TE and the second electrode RE may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The second insulating layer SIL2 may cover the first electrode TE, the second electrode RE, and the first insulating layer SIL1. The second insulating layer SIL2 may have insulation and optical functions. The second insulating layer SIL2 may be formed of the material illustrated in the first insulating layer SIL1.

In FIG. 8, the bridge electrode CE is formed on a lower layer of the first electrode TE and the second electrode RE, but the present disclosure is not necessarily limited thereto. For example, the bridge electrode CE may be formed on an upper layer of the first electrode TE and the second electrode RE.

Figure 9:
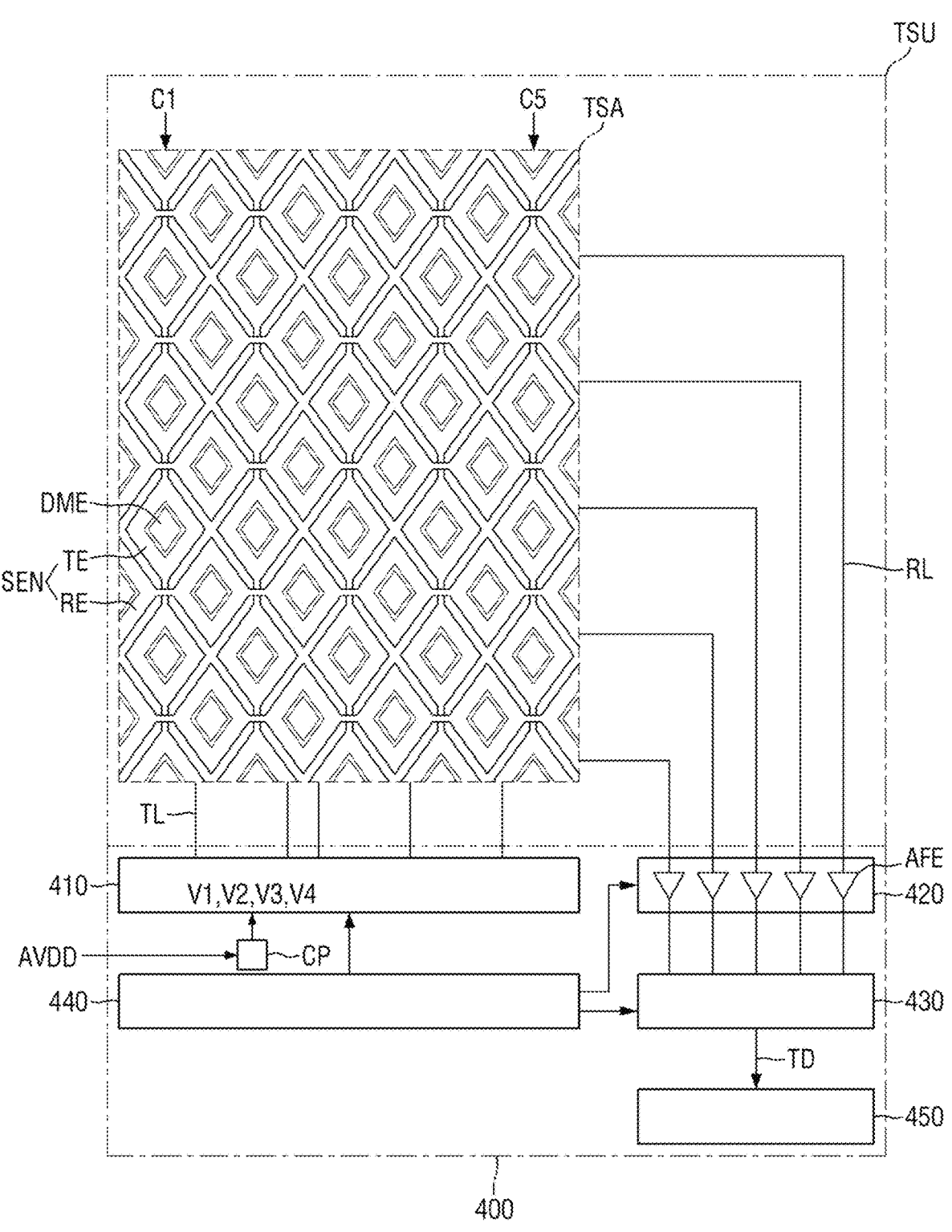
FIG. 9 is a block diagram schematically illustrating components of the touch unit and the touch driver according to an exemplary embodiment of the present disclosure.

FIG. 9 is a block diagram schematically illustrating components of the touch unit and the touch driver according to an exemplary embodiment of the present disclosure.

Referring to FIG. 9, the display device 10 may include a touch unit TSU and a touch driving circuit 400. The touch unit TSU illustrated in FIG. 9 is substantially the same as the touch unit TSU described with reference to FIGS. 2 to 8. Therefore, to the extent that an element is not described in detail with respect to FIG. 9, it may be understood that the element is at least similar to a corresponding element that has been described elsewhere within the present disclosure, for example, with reference to FIGS. 2 to 8.

The touch driving circuit 400 includes a driving signal output unit 410, a sensing circuit unit 420, an analog-to-digital conversion unit 430, a touch control unit 440, and a touch data compensation unit 450. In addition, the touch driving circuit 400 may further include a charge pump CP that receives an analog voltage AVDD from the outside and boosts the received analog voltage AVDD.

Figure 10:
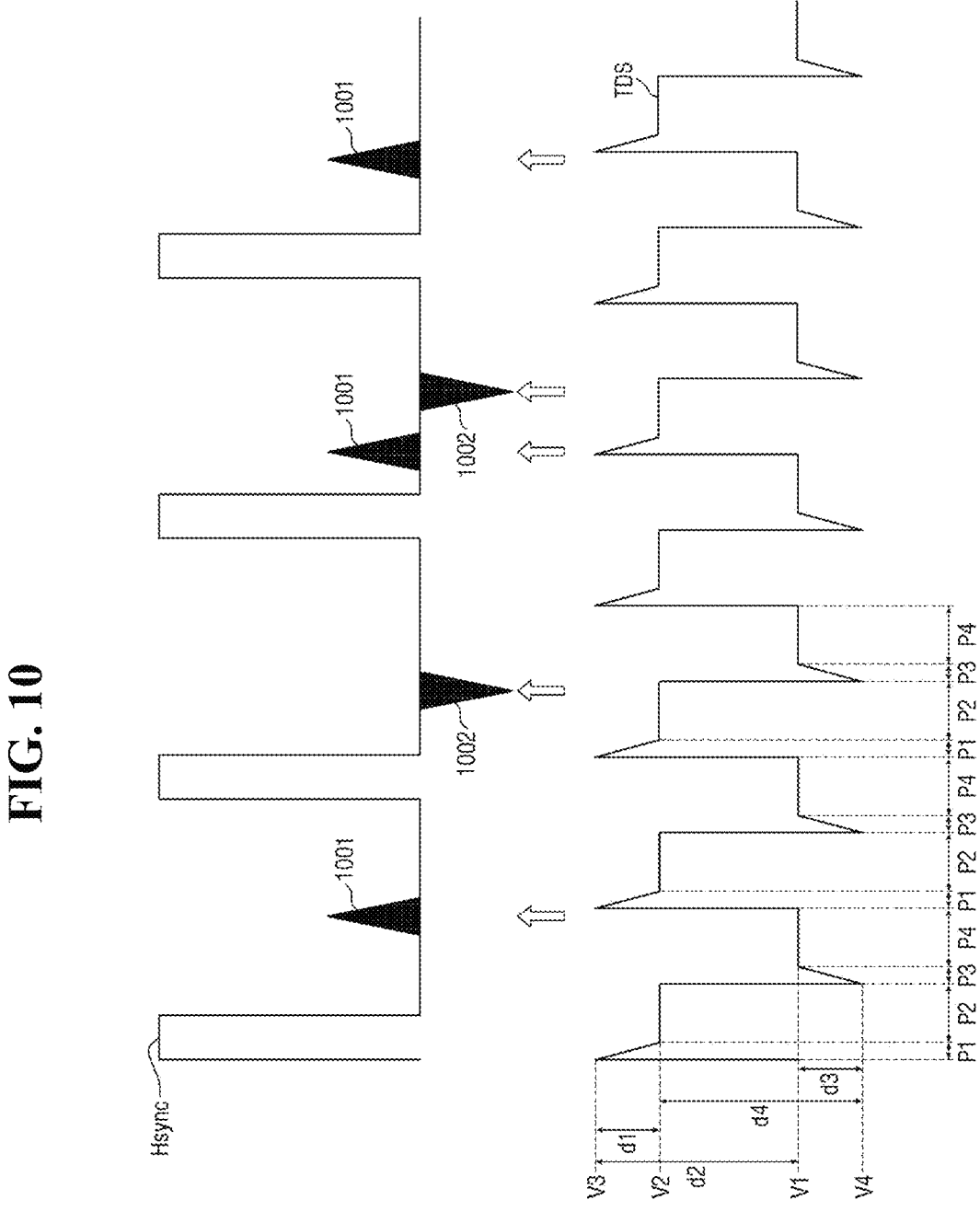
FIG. 10 is a waveform diagram illustrating a touch driving signal according to an exemplary embodiment of the present disclosure.

The charge pump CP may generate a voltage for generating a touch driving signal (TDS in FIG. 10). The charge pump CP generates a first voltage (V1 in FIG. 10), a second voltage (V2 in FIG. 10) greater than the first voltage V1, a third voltage (V3 in FIG. 10) greater than the second voltage V2, and a fourth voltage (V4 in FIG. 10) lower than the first voltage V1, as the voltage for generating the touch driving signal TDS.

The driving signal output unit 410 outputs the touch driving signals TDS to the first electrodes TE through the touch driving lines TL. The touch driving signal TDS may be a signal in the form of a plurality of pulses.

The driving signal output unit 410 may output the touch driving signals TDS to the touch driving lines TL in a predetermined order. For example, the driving signal output unit 410 may sequentially output the touch driving signals TDS from the first electrodes TE of a first column C1 disposed at the leftmost side of the touch sensing area TSA to the first electrodes TE of a fifth column C5 disposed at the rightmost side of the touch sensing area TSA.

The sensing circuit unit 420 may be connected to the second electrodes RE through the sensing lines RL. The sensing circuit unit 420 may sense the amount of change in charge of mutual capacitance of touch nodes corresponding to intersections of the first electrodes TE and the second electrodes RE through the sensing lines RL.

The sensing circuit unit 420 may include operational amplifiers AFE for sensing the amount of change in charge of the mutual capacitance of the touch nodes. The operational amplifiers AFE may be connected to the sensing lines RL in a one-to-one manner. The operational amplifiers AFE may amplify raw data input in analog form.

The analog-to-digital conversion unit 430 converts each of the output voltages of the operational amplifiers AFE of the sensing circuit unit 420 into touch sensing data TD, which is digital data.

The touch control unit 440 controls a driving timing of the driving signal output unit 410, the sensing circuit unit 420, and the analog-to-digital conversion unit 430. The touch control unit 440 may output a timing signal for synchronization of the driving signal output unit 410, the sensing circuit unit 420, and the analog-to-digital conversion unit 430 to each of the driving signal output unit 410, the sensing circuit unit 420, and the analog-to-digital conversion unit 430.

The touch control unit 440 sets a swing and voltage level of the touch driving signal TDS based on a control signal of the display driving circuit 200. The touch control unit 440 causes the voltage level of the touch driving signal TDS to rise and then rapidly fall during a rising edge period. In addition, the touch control unit 440 causes the voltage level of the touch driving signal TDS to fall and then rapidly rise during a falling edge period. This is to minimize noise affecting the display panel during the rising edge period and falling edge period of the touch driving signal TDS. The characteristics of the touch driving signal TDS will be described in detail later with reference to FIG. 10.

The touch data compensation unit 450 receives touch sensing data TD sensed from all touch nodes in the touch sensing area TSA from the analog-to-digital conversion unit 430. The touch data compensation unit 450 analyzes the touch sensing data TD, calculates a touch area ratio, and compensates for the touch sensing data TD according to the touch area ratio.

FIG. 10 is a waveform diagram illustrating a touch driving signal TDS according to an exemplary embodiment of the present disclosure. For example, FIG. 10 illustrates driving waveform diagrams of a horizontal synchronization signal Hsync and a touch driving signal TDS.

According to an exemplary embodiment, the touch control unit 440 sets the touch driving signal TDS to swing between the first voltage V1 and the second voltage V2 that is higher than the first voltage V1.

The touch control unit 440 sets a period during which the touch driving signal TDS is output as follows.

The period during which the touch driving signal TDS is output includes a rising edge period P1 (e.g., a first period) during which the touch driving signal TDS rises from the first voltage V1 to the third voltage V3 and falls from the third voltage V3 to the second voltage V2, a high level period P2 (e.g., a second period) during which the touch driving signal TDS maintains the second voltage V2, a falling edge period P3 (e.g., a third period) during which the touch driving signal TDS falls from the second voltage V2 to the fourth voltage V4 and rises from the fourth voltage V4 to the first voltage V1, and a low level period P4 (e.g., a fourth period) during which the touch driving signal TDS maintains the first voltage V1.

The touch control unit 440 sets the touch driving signal TDS to rise to the third voltage V3, which is higher than the second voltage V2, and then lower from the third voltage V3 to the second voltage V2, during the rising edge period P1 during which the touch driving signal TDS rises from the first voltage V1 to the second voltage V2. For example, the touch driving signal TDS rises from about 0 V to about 5 V and then falls to about 4 V, during the rising edge period P1. In an exemplary embodiment, by rapidly lowering the voltage level raised during the rising edge period P1 of the touch driving signal TDS by a predetermined level, a noise effect 1001 of the touch driving signal TDS on the display screen of the display panel 100 may be reduced.

The touch control unit 440 sets the touch driving signal TDS to fall to the fourth voltage V4, which is lower than the first voltage V1, and then rise from the fourth voltage V4 to the first voltage V1, during the falling edge period P3 during which the touch driving signal TDS falls from the second voltage V2 to the first voltage V1. For example, the touch driving signal TDS falls from about 4 V to about-1 V and then rises to about 0 V, during the falling edge period P3. In an exemplary embodiment, by rapidly raising the voltage level fell during the falling edge period P3 of the touch driving signal TDS by a predetermined level, a noise effect 1002 of the touch driving signal TDS on the display screen of the display panel 100 may be reduced.

According to an exemplary embodiment, a length of the rising edge period P1 is shorter than a length of the high level period P2. For example, a length of the period during which the touch driving signal TDS rises from about 0 V to about 5 V and then falls again to about 4 V is shorter than a length of the period during which the touch driving signal TDS maintains about 4 V thereafter.

According to an exemplary embodiment, a length of the falling edge period P3 is shorter than a length of the low level period P4. For example, a length of the falling edge period P3 during which the touch driving signal TDS falls from about 4 V to about-1 V and then rises again to about 0 V is shorter than a length of the period during which the touch driving signal TDS maintains about 0 V thereafter.

According to an exemplary embodiment, the length of the high level period P2 is the same as the length of the low level period P4. For example, the period during which the touch driving signal TDS maintains about 4 V after the rising edge period P1 may be the same as the period during which the touch driving signal TDS maintains about 0 V after the falling edge period P3.

According to an exemplary embodiment, the touch control unit 440 sets a first voltage difference d1 between the third voltage V3 and the second voltage V2 to about 30% of a second voltage difference d2 between the first voltage V1 and the third voltage V3. For example, when the touch driving signal TDS rises by 10 V from about 0 V to about 10 V during the rising edge period P1, the touch driving signal TDS may fall again by about 3 V, corresponding to about 30% of 10 V, and then fall to about 7 V.

According to an exemplary embodiment, the touch control unit 440 sets a third voltage difference d3 between the fourth voltage V4 and the first voltage V1 to about 30% of a fourth voltage difference d4 between the second voltage V2 and the fourth voltage V4. For example, when the touch driving signal TDS falls by 10 V from about 10 V to about 0 V during the falling edge period P3, the touch driving signal TDS may rise again by about 3 V, corresponding to about 30% of 0 V, and then rise to about 3 V.

According to an exemplary embodiment, the touch control unit 440 sets the first voltage difference d1 and the third voltage difference d3 to be the same. For example, the touch control unit 440 sets the first voltage difference d1, which is the amount of decrease at which the touch driving signal TDS rises and then falls during the rising edge period P1 and the third voltage difference d3, which is the amount of increase at which the touch driving signal TDS falls and then rises during the falling edge period P3 to be the same.

The exemplary embodiments of the present disclosure have been described hereinabove with reference to the accompanying drawings, but it will be understood by one of ordinary skill in the art to which the present disclosure pertains that various modifications and alterations may be made without departing from the technical spirit or essential feature of the present disclosure.

In concluding the detailed description, those skilled in the art will appreciate that many variations and modifications can be made to the embodiments discussed herein without substantially departing from the principles of the present invention.

What is claimed is:

1. A display device, comprising:
a display panel including touch electrodes; and
a touch driving circuit including a driving signal output unit configured to output a touch driving signal supplied to the touch electrodes and a touch control unit configured to control the driving signal output unit,
wherein the touch control unit is further configured to:
set the touch driving signal to swing between a first voltage and a second voltage that is higher than the first voltage,
set the touch driving signal to rise to a third voltage that is higher than the second voltage and then lower from the third voltage to the second voltage, during a rising edge period during which the touch driving signal rises from the first voltage to the second voltage, and
set the touch driving signal to fall to a fourth voltage that is lower than the first voltage and then rise from the fourth voltage to the first voltage, during a falling edge period during which the touch driving signal falls from the second voltage to the first voltage.

2. The display device of claim 1, wherein a period during which the touch driving signal is output includes:
the rising edge period during which the touch driving signal rises from the first voltage to the third voltage and falls from the third voltage to the second voltage,
a high level period during which the touch driving signal maintains the second voltage,
the falling edge period during which the touch driving signal falls from the second voltage to the fourth voltage and rises from the fourth voltage to the first voltage, and
a low level period during which the touch driving signal maintains the first voltage.

3. The display device of claim 2, wherein a length of the rising edge period is shorter than a length of the high level period.

4. The display device of claim 2, wherein a length of the falling edge period is shorter than a length of the low level period.

5. The display device of claim 2, wherein a length of the high level period is the same as a length of the low level period.

6. The display device of claim 1, wherein the touch control unit is further configured to set a first voltage difference between the third voltage and the second voltage to about 30% of a second voltage difference between the first voltage and the third voltage.

7. The display device of claim 6, wherein the touch control unit is further configured to set a third voltage difference between the fourth voltage and the first voltage to about 30% of a fourth voltage difference between the second voltage and the fourth voltage.

8. The display device of claim 7, wherein the touch control unit is further configured to set the first voltage difference and the third voltage difference to be the same.

9. The display device of claim 1, wherein the touch driving circuit further includes a charge pump configured to generate the first voltage, the second voltage, the third voltage, and the fourth voltage.

10. The display device of claim 1, wherein the touch unit is configured to sense a touch in a capacitive manner.

11. A mobile electronic device, comprising:

a display panel including touch electrodes; and a touch driving circuit including a driving signal output unit configured to output a touch driving signal supplied to the touch electrodes and a touch control unit configured to control the driving signal output unit, wherein the touch control unit is further configured to:

set the touch driving signal to swing between a first voltage and a second voltage that is higher than the first voltage, set the touch driving signal to rise to a third voltage that is higher than the second voltage and then lower from the third voltage to the second voltage, during a rising edge period during which the touch driving signal rises from the first voltage to the second voltage, and set the touch driving signal to fall to a fourth voltage that is lower than the first voltage and then rise from the fourth voltage to the first voltage, during a falling edge period during which the touch driving signal falls from the second voltage to the first voltage.

12. The mobile electronic device of claim 11, wherein a period during which the touch driving signal is output includes:

the rising edge period during which the touch driving signal rises from the first voltage to the third voltage and falls from the third voltage to the second voltage, a high level period during which the touch driving signal maintains the second voltage, the falling edge period during which the touch driving signal falls from the second voltage to the fourth voltage and rises from the fourth voltage to the first voltage, and a low level period during which the touch driving signal maintains the first voltage.

13. The mobile electronic device of claim 12, wherein a length of the rising edge period is shorter than a length of the high level period.

14. The mobile electronic device of claim 12, wherein a length of the falling edge period is shorter than a length of the low level period.

15. The mobile electronic device of claim 12, wherein a length of the high level period is the same as a length of the low level period.

16. The mobile electronic device of claim 11, wherein the touch control unit is further configured to set a first voltage difference between the third voltage and the second voltage to about 30% of a second voltage difference between the first voltage and the third voltage.

17. The mobile electronic device of claim 16, wherein the touch control unit is further configured to set a third voltage difference between the fourth voltage and the first voltage to about 30% of a fourth voltage difference between the second voltage and the fourth voltage.

18. The mobile electronic device of claim 17, wherein the touch control unit is further configured to set the first voltage difference and the third voltage difference to be the same.

19. The mobile electronic device of claim 11, wherein the touch driving circuit further includes a charge pump configured to generate the first voltage, the second voltage, the third voltage, and the fourth voltage.

20. The mobile electronic device of claim 11, wherein the touch unit is configured to sense a touch in a capacitive manner.

* * * * *